United States Patent [19]

Luckow

[11] Patent Number: 5,522,501

[45] Date of Patent: Jun. 4, 1996

[54] COMPACT DISC CASE WITH A HOLDING CLAMP

[76] Inventor: Hans-Jürgen Luckow, Rhener Kehre 10, D-24558 Henstedt-Rhen, Germany

[21] Appl. No.: 467,750

[22] Filed: Jun. 6, 1995

Related U.S. Application Data

[62] Division of Ser. No. 185,585, Jan. 21, 1994, Pat. No. 5,450,951.

[30] Foreign Application Priority Data

| Jan. 27, 1993 | [DE] | Germany | 43 02 236.7 |
| Nov. 19, 1993 | [DE] | Germany | 43 39 335.7 |
| Dec. 8, 1993 | [DE] | Germany | 43 41 763.9 |

[51] Int. Cl.⁶ ............................................. B65D 85/57
[52] U.S. Cl. .................................. 206/308.1; 206/309
[58] Field of Search ....................... 206/303, 308.1, 206/308.2, 309, 310, 493

[56] References Cited

U.S. PATENT DOCUMENTS

| 4,253,571 | 3/1981 | Keohan | 206/303 X |
| 4,535,888 | 8/1985 | Nusselder | 206/308.1 X |
| 4,702,369 | 10/1987 | Philosophe | 206/308.1 X |
| 4,750,618 | 6/1988 | Schubert | 206/309 |
| 4,793,479 | 12/1988 | Otsuka et al. | 206/308.1 |
| 4,793,480 | 12/1988 | Gelardi et al. | 206/308.1 X |
| 5,238,107 | 8/1993 | Kownacki | 206/310 |
| 5,244,085 | 9/1993 | Lammerant et al. | 206/308.1 |
| 5,269,409 | 12/1993 | Brandt et al. | 206/309 |
| 5,284,248 | 2/1994 | Dunker | 206/308.1 |
| 5,450,951 | 9/1995 | Luckow | 206/308.1 |

FOREIGN PATENT DOCUMENTS

| 0188663 | 7/1986 | European Pat. Off. . |
| 3301644A1 | 7/1984 | Germany . |
| 8810917U1 | 2/1989 | Germany . |
| 4057778 | 2/1992 | Japan . |
| 2154550 | 9/1985 | United Kingdom . |

*Primary Examiner*—Bryon P. Gehman
*Attorney, Agent, or Firm*—Harness, Dickey & Pierce

[57] ABSTRACT

The invention concerns a case for storing compact discs. In accordance with the invention, this case is constructed in such a way that the interior part in the area of the clamping slots is provided with a profile closure strip in such a manner that the interior ridges separating the clamping slots from each other protrude farther into a direction away from the interior part than the outer ridges limiting the clamping slots at the outside.

16 Claims, 13 Drawing Sheets

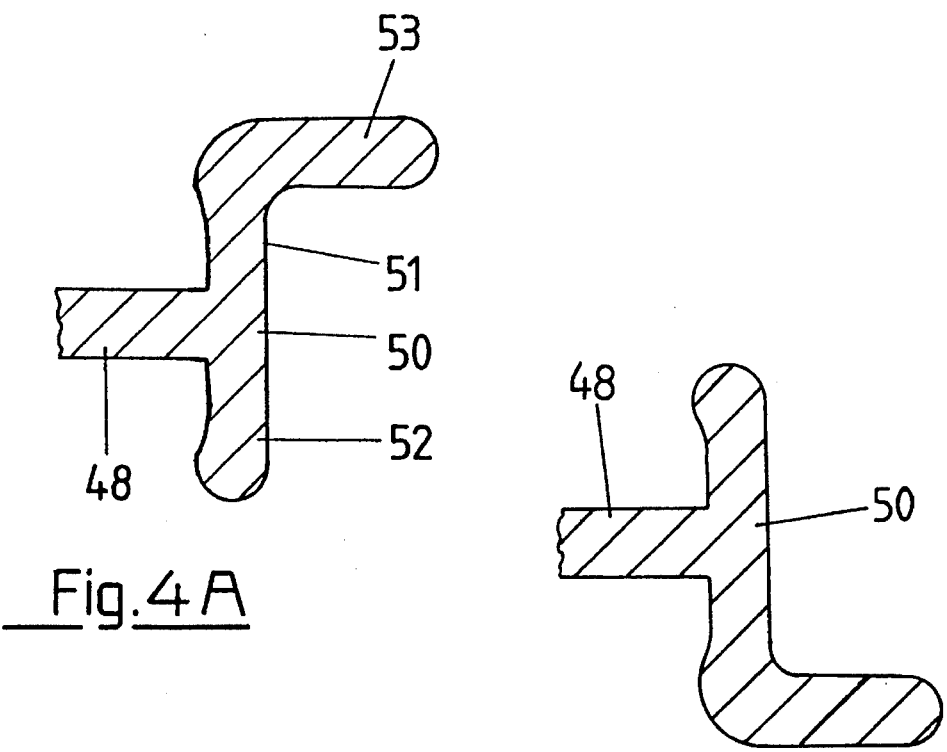
Fig.4A
Fig.4B
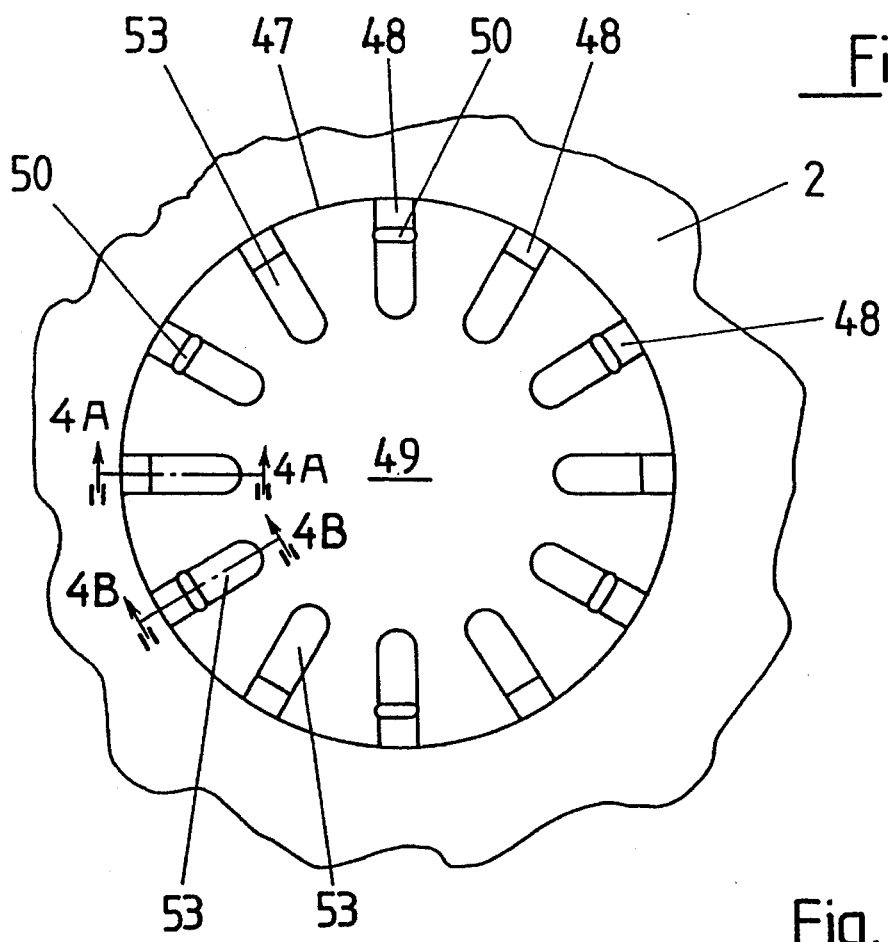
Fig.3

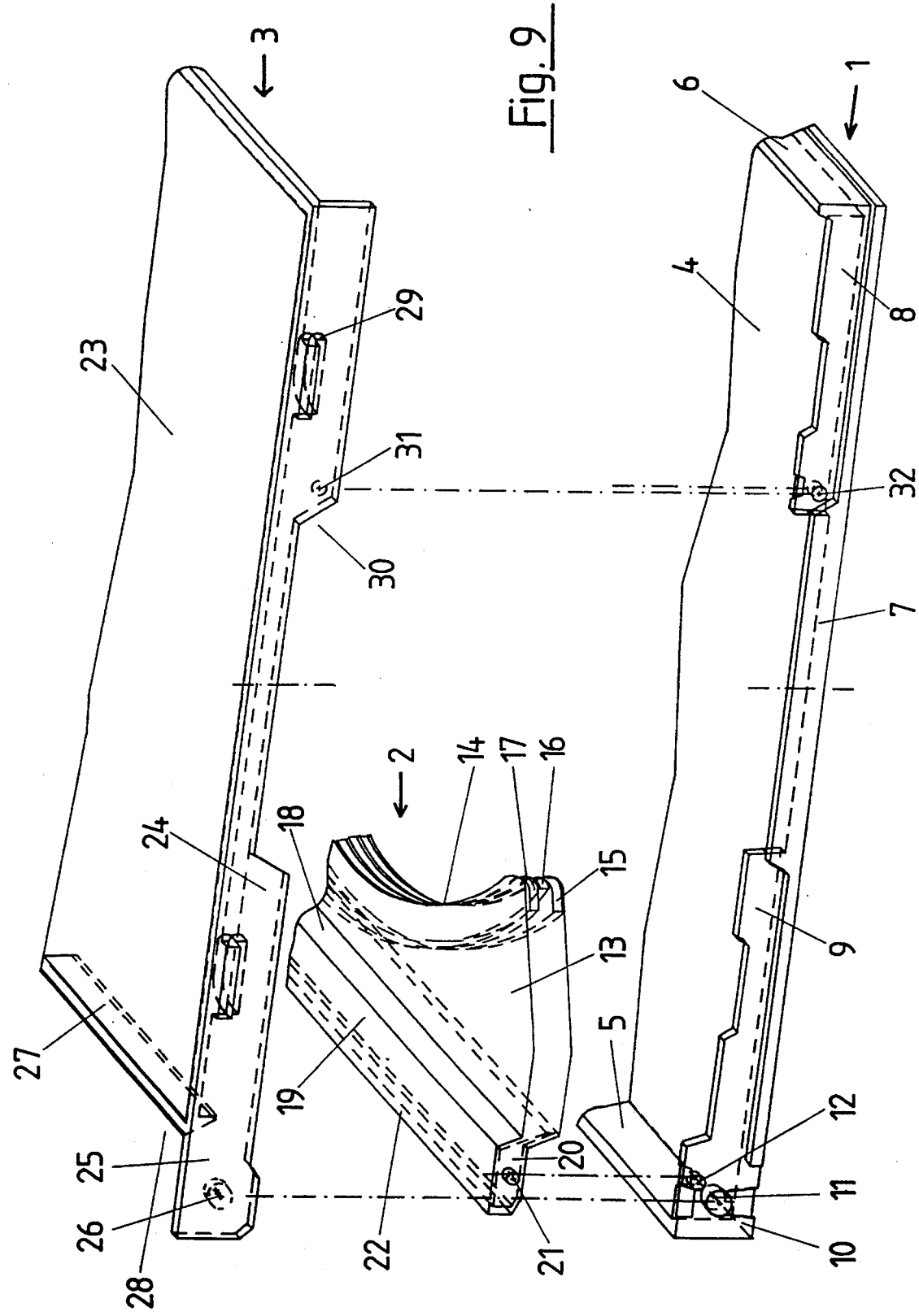

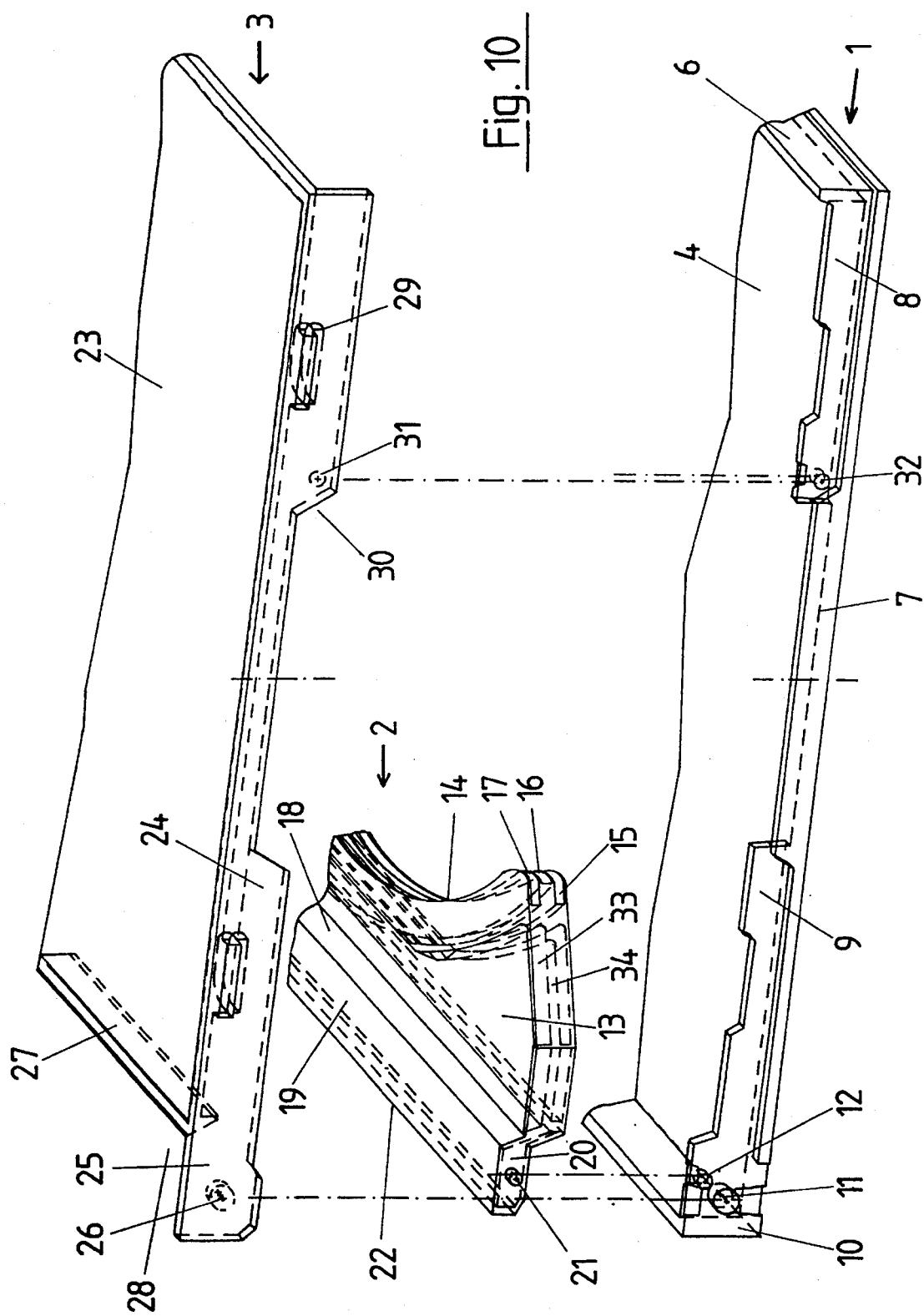

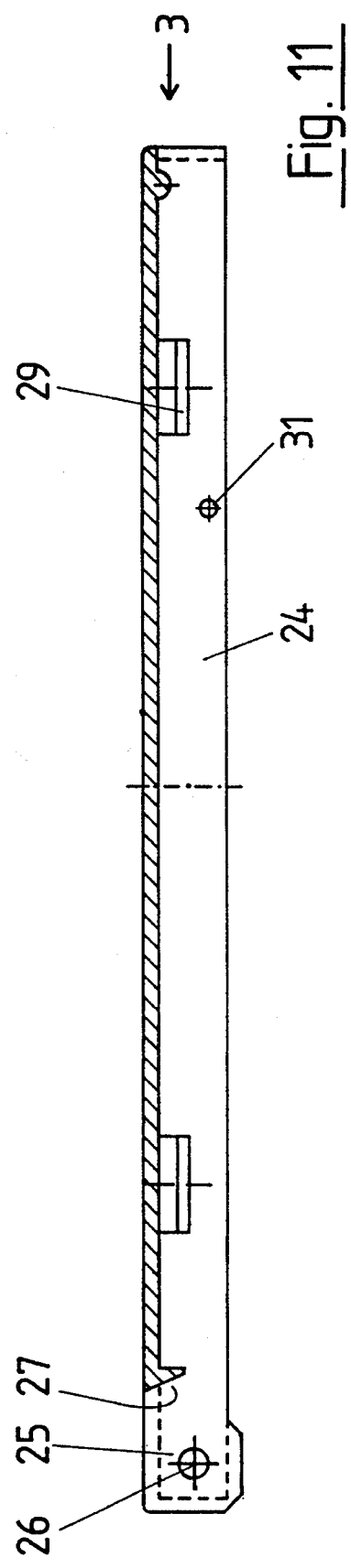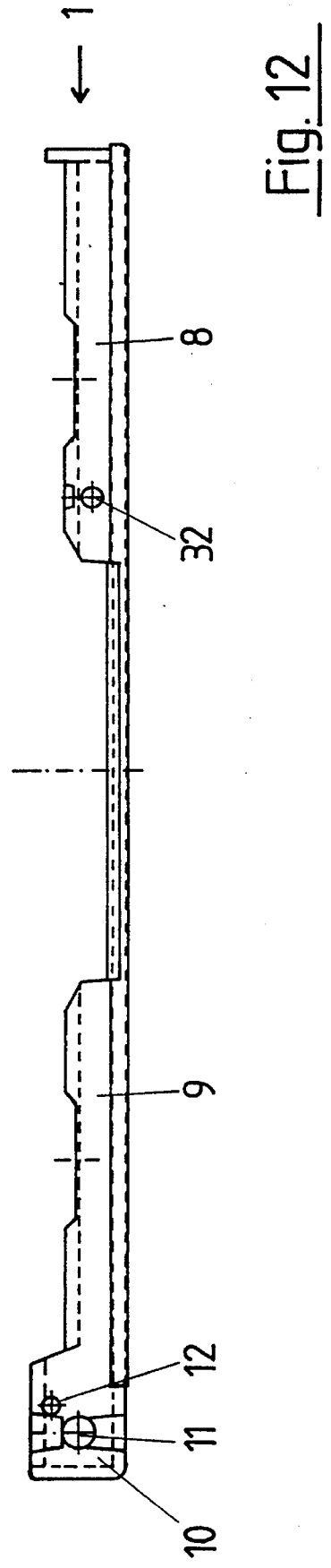

COMPACT DISC CASE WITH A HOLDING CLAMP

This is a division of patent application Ser. No. 08/185,585, filed Jan. 21, 1994 now U.S. Pat. No. 5,450,951.

BACKGROUND AND SUMMARY OF THE INVENTION

The invention concerns a case for storing compact discs with a lower shell, an upper shell and an interior part, which is disposed in a hinged arrangement between the lower shell and the upper shell and whose interior part includes means for holding at least one compact disc in a clamped position.

Cases with holding clamps are already known, which, on the whole, have good and functionally appropriate characteristics. However, it has become apparent that the handling of the compact discs during their removal as well as during the insertion of compact discs into the clamping slots can still be improved.

Such cases have the functional objective of storing and transporting compact discs (CD's). They protect them from dust and other environmental effects. With regard to obvious prior use, only enclosures for storing just one CD are known, in which the interior part holding the CD is not rotatable, but is firmly connected by a locking connection to the lower shell. This interior part, also called "tray", is automatically stocked with the CD in appropriate machines and then locked into place in the lower shell of the case.

From DE 88 10 917 U1, a case for storing two CD's is known, where the interior part between the upper and the lower shells is rotatable and has clamping means on both sides for one CD. This case makes it possible to store two CD's, but it has the exterior dimensions of a conventional case for one CD. If more than two CD's are to be stored in one case, then expensive and relatively large designs are employed, for example, like those according to DE 33 01 644 A1. In this case, the interior part is configured as a central shell and carries a CD on each side; in addition, holding means for one CD each, are provided at the upper and lower shell, respectively. All these cases have in common that the CD lies on a storage plate and is stored in the region of its center hole.

It is the object of the present invention, therefore, to improve a case of the type mentioned in the introduction to such an extent that its handling during insertion and removal of a compact disc is improved.

This problem is solved in accordance with the invention by providing the interior part in the region of the holding slots with a profile border strip in such a manner that the interior ridges separating the clamping slots from each other protrude farther in a direction away from the interior part than the exterior ridges limiting the holding slots on the outside.

By the combination of the profiled holding slots and the interior ridges as well as the exterior ridges, a laterally displaced disposition of the compact discs is brought about and at the same time sufficient support for the compact discs is provided. In particular, this makes it possible to provide all clamping slots with an approximately equal effective depth of immersion for the compact discs, so that equal insertion and removal forces are provided. However, depending on the anticipated application, it is also possible to achieve different depths of immersion.

The invention is based on the recognition that a compact disc must not necessarily be stored by placing a flat side on a storage plate, but that it is sufficient to merely hold it clamped at the edge region. According to the invention, the clamping devices grip the edge region only over half of the circumference or over part of half of the circumference. Under certain conditions, the clamping means can be discontinuous and thus only hold individual points or partial regions of half of the circumference in a clamped position. The interior part of the case according to the invention can be produced with very little material, because a storage plate extending over the surface of the CD is not required. Under certain circumstances, thin separating plates between the CD's can be provided for the storage of several CD's above one another, which prevent scratching of the surface of the CD's. Such separating plates are, however, not comparable to the state-of-the-art storage plates, because they merely have a protective function and do not exercise a holding function.

From EP 188 663 A2 it is, in fact, already known in principle to provide clamping means for holding a CD at its edge. However, these clamping means only have the purpose of providing additional holding for a CD, which is already lying on a storage plate, and which clamping means are, moreover, distributed over the entire circumference of the CD. However, this is different from the present invention, which proposes an exclusive clamping support over only one half of the periphery and thus achieves the above-mentioned essential advantages, especially material savings for the interior part and a smaller space requirement.

It is practically useful to provide clamping means in the form of slots, into which the edge portion of a CD can be inserted. It is advantageous that these slots be tapered toward their bottom. This taper ensures the clamping support of the edge regions and has the additional effect that the sides of the slot only exert a frictional force on a very narrow edge region during the insertion and removal of the CD's, so that damage to the information-carrying portions of the CD is avoided.

It is useful to give the slot the shape of a circular arc in the plane of the compact disc to be inserted in it, the radius of which corresponds approximately to the radius of the compact disc. The slot can also be discontinuous and grasp the CD only at individual points.

The case according to the invention is, as a rule, designed to receive several CD's. Because these CD's are to be stored in a space-saving manner, they are, as a rule, held at the interior part lying one on top of the other and at a small distance from each other. It is useful to construct the clamping devices, which are placed one above the other, in the interior part in such a manner that they receive the compact discs in a position offset from each other. This makes it easier to grasp and pull out a CD, which is stored between other CD's. If, for example, the case is designed to receive three CD's, then the central slot can have a lower depth, so that the CD being held in it protrudes somewhat relative to the CD's located at the sides opposite the slot, and can, therefore, be easily pulled out.

The case according to the invention can be designed in such a manner that it has the outer dimensions of a typical single package for compact discs, but is still capable of receiving three CD's. The interior part is usefully hinged like a book between the upper and lower shells, and its hinge axis lies, therefore, at the same side edge as the hinge axis of the upper and lower shells. However, it is also possible to place the hinge axis of the interior part at the edge of the side opposite to the hinge axis of the upper and lower shells.

The case according to the invention is usefully made of a hard plastic. The upper as well as the lower shells consist advantageously of a transparent plastic, such as, for example, glass clear polystyrol.

If, in the claims and the description, a compact disc or a CD is referred to, then this term is intended to include within the framework of the invention also other disc-shaped storage means, such as, for example, diskettes, chip boards and the like.

A symmetrical arrangement is achieved by giving the outer ridges approximately the same dimensions.

In order to improve the ease of use it is proposed to make all clamping slots equally deep.

The support of the compact discs is favorably affected by giving the interior ridges different lengths in a direction away from the interior part.

The ability to grasp the intermediate compact disc can also be enhanced by making a bottom portion of the intermediate clamping slot protrude by a shorter distance into the interior part than the bottom portions of the outer clamping slots.

In order to place the interior portion into a defined operating position, it is proposed that the interior part be fixed in an open position relative to the lower shell, and a locking projection corresponding to a recess be provided.

Especially in the design of the locking device it is contemplated to place the locking projection in the region of the interior part and that it be receivable in the closed position by a locking recess, which is disposed in the region of a side wall piece of the lower shell.

However, a different embodiment may consist in constructing the locking projection as part of the side wall portion and having it penetrate, in the open position of the interior part into a locking recess which is disposed in the area of the interior part.

In the drawing the embodiments of the invention are presented schematically. The following is shown:

DESCRIPTION OF THE PREFERRED EMBODIMENTS

Figure 1:
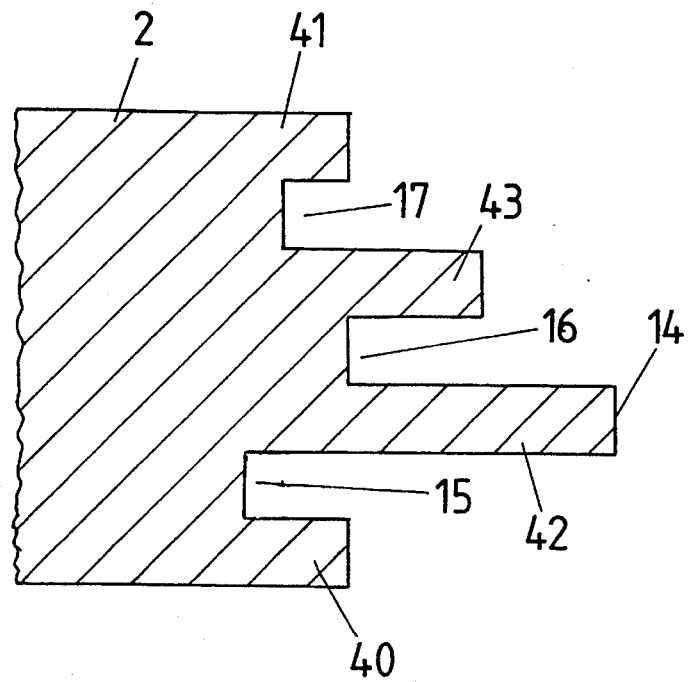
FIG. 1 a partial presentation of a section through the interior part.

The CD-case according to the invention shown in FIG. 9 includes a lower shell (1), an interior part (2) and an upper shell (3). The lower shell (1) contains a bottom plate (4) at the edges of which the rear wall part (5), the front wall part (6), the side wall portions (7), the ridges (8,9) as well as the hinge wall pieces (10) rise vertically from the plane of the bottom plate. The hinge wall pieces (10) are joined in one piece to the ridges (9) and are joined at their corners with the rear wall piece (5). The ridges (8,9) are displaced somewhat toward the inside with respect to the side wall pieces (7). The hinge wall pieces (10) each contain a bore (11) and a bore (12), which have the purpose of receiving the hinge pins and the upper shell (3) or the interior part (2), respectively.

The interior part (2) contains a holding plate (13) with a border strip (14) which forms a circular arc in the plane of the holding plate (13), the radius of which circular arc is adapted to the radius of the compact disc. The clamping slots (15,16,17) are cut into the border strip (14) into each of which a CD can be inserted and held there in a clamped position. The holding plate (13) has, as a rule, not the same thickness over its entire extent as it has at the point of its border strip (14). Normally it is either hollowed out from the top or from the bottom and it reaches its full thickness only at its edges and especially in the area of the border strip (14). The cavities of the recesses are not shown in FIG. 9.

The slots (15,16,17) are conically tapered toward the bottom; however, this is not shown in the drawing. The slot (16), which is cut into the, center of the border strip (14), has a smaller lower depth dimension than the outer slots (15,17), so that the CD inserted into it protrudes at its forward wall part (6) of the lower shell (1) relative to the two outer CD's inserted into the slots (15) or (17), respectively, arid thus can be easily removed in spite of its placement between the two other CD's. At the back side of the holding plate (13) a diagonal wall (18), which forms an obtuse angle with the holding plate (13), is disposed and carries a rear edge plate (19), which proceeds toward the outside and parallel to the holding plate (13). The rear edge plate (19) carries at its ends, which are facing the hinge wall pieces (10) of the lower shell (1), the hinge wall parts (20) with one hinge pin (21) each, which reach into the bores (12) of the hinge wall pieces (10). At the same time, the hinge wall parts (20) of the interior part (2) are enclosed by the hinge wall pieces (10) of the lower shell (1).

The distance of the hinge pins (21) from the back edge (22) of the rear wall plate (19) is smaller than the distance of the bore (12) from the rear wall part (5) and the bottom plate (4), so that an unimpeded rotation of the interior part (2) about the axis formed by the hinge pins (21) and the bores (12) is possible. During a complete rotation of the interior part (2), the holding plate (13) impinges upon the upper edge of the rear wall part (5). Due to the fact that the rear edge plate (19) with its hinge wall parts (20), which contain the hinge pins (21), is offset relative to the plane of the holding plate (13), it (the holding plate) does not impinge upon the rear wall part (5) until it is rotated by more than 180°. The interior part (2) can, therefore, be completely folded over, like the page of a book.

The upper shell (3) contains a cover plate (23) at which the narrow-sided walls (24) rise vertically from the plane of the cover plate at two opposite edges. The narrow-sided walls (24) are connected in one piece with the hinge wall parts (25), which are provided with the inwardly protruding hinge pins (26). The edge of the cover plate (23) facing the hinge wall parts (25) contains a strip (27), which points in the same direction as the narrow-sided walls (24), and it includes along with the hinge wall parts (25) a recess (28). There are inwardly extended support projections (29) at the narrow-sided walls (24), which have the function of holding an insert card, not shown here, which is inserted into the upper shell. The strip (27) serves as a stop for this insert card. The narrow-sided walls (24) each contain a trapezoidally shaped recess (30). The hinge wall parts (25) of the upper shell (3) grasp the hinge wall pieces (10) of the lower shell (1) from the outside. At the same time, the hinge pins (26) protrude into the bores (11 ). When the case is closed, the recess between the rear wall part (5) and the edge of the cover plate (23), which contains the strip (27), is filled by the rear edge plate (19) of the interior part (2). The side wall pieces (7) of the lower shell (1) interlock positively with the recesses (30) of the narrow-sided walls (24).

One Can observe in FIG. 9 that because of the mutually independent hinge arrangements for the linkage of the lower shell (1) with the interior part (2), on the one hand, and of the lower shell (1) with the upper shell (3), on the other hand, the interior part can initially be separately stocked with CD's and can then be subsequently inserted into the case.

The narrow-sided walls (24) of the upper shell (3) each contain at their interior side one locking projection (31), which interact with the recesses (32) in the ridges (8) of the lower shell (1) to produce a snap-in closing mechanism.

FIG. 10 shows a further embodiment of the invention, in which the interior part (2) constructed somewhat differently. It can be seen here that the holding plate (13) is constructed as a relatively thin part. It becomes thicker toward the border edge (14) in order to make it possible to cut the slots ( 15, 16,17). At the side edges of the holding plate (13), the ridges (33), which are joined to the diagonal wall (18), are provided, in order to increase the dimensional stability of the interior part (2).

FIG. 11 and FIG. 12 show, in a side view, a further embodiment of the case according to the invention. For the sake of simplicity the interior part (2) is not shown here. It is constructed exactly like the interior part (2) of FIG. 9 or 10. The lower shell (1) contains no side wall pieces in this embodiment. In this case, the narrow-sided walls (24) of the upper shell (3) are made to be continuous without any recess. In FIGS. 10 to 12 the reference symbols, which are not described in any detail, designate the same parts as in FIG. 9.

As an alternative to the embodiments described above, it is contemplated to construct the interior part (2) in the region of the border edge (14) as a profile part. Here, the profiling can be constructed according to the embodiment of FIG. 1 in such a manner that the clamping slots (15,17) can be limited at the outside by the approximately equally sized outer ridges (40,41). The clamping slots (15,16,17) are separated from each other by the interior ridges (42,43), which have different longitudinal extensions in a direction away from the interior part (2). However, in principle, it is also conceivable to give the interior ridges (42,43) approximately equal dimensions. The clamping slot (16) protrudes not as far into the interior part (2) with a part of its bottom as outer the clamping slots (15,17). In particular, it is contemplated to provide all the clamping slots (15,16,17) with approximately the same depth of immersion for the compact discs. In principle, however, different profile depths are also conceivable.

Figure 2:
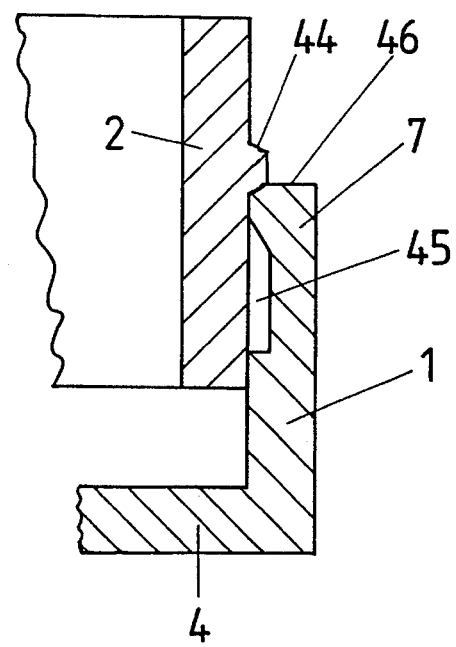
FIG. 2 a partial presentation of the holding means of the interior part relative to the lower shell, FIG. 3 a top view of a tray, which is equipped with a holding clamp for compact discs in the area of their central openings, FIGS. 4a and 4b each shows a partial presentation of alternating cross ridges of a holding clamp in accordance with FIG. 3, FIG. 5 a modified top view of an embodiment of the clamping part according to FIG. 1, FIG. 6 a book-like non-rotatable device for holding compact discs with a limitation of the angle of rotation of the tray, FIG. 7 a presentation of the concept of a pick-up device for the defined opening of the tray by opening a cover of the packaging means, FIG. 8 a modified design of the device for holding the compact disc in a holding clamp, FIG. 9 a perspective presentation according to an exploded view of the upper and lower shell as well as a rotatable intermediate part for holding the compact disc in a holding clamp, FIG. 10 a presentation according to FIG. 9 with a modified design of the interior part for holding the compact disc in a holding clamp, FIG. 11 an upper shell according to another embodiment, FIG. 12 a lower shell which is constructed in a manner corresponding to that of the upper shell of FIG. 11, FIG. 13 a partial presentation of a side view of an interior part, which is constructed of two rotatable parts connected to each other, FIG. 14 an enlarged partial view corresponding to the viewing direction XIV as shown in FIG. 13, FIG. 15 a side view of the principle of an interior part which is ribbed in the region of the locating surfaces of the clamping slots, FIG. 16 a top view for illustrating the penetration of the interior part and the lower shell in order to facilitate a pick-up function while opening the upper shell, FIG. 17 a perspective presentation of a case with a tray for holding a compact disc in a holding clamp for a compact disc in the region of its central opening, FIG. 18 a side view of the case according to FIG. 17, FIG. 19 a top view of the interior part according to FIG. 18 and FIG. 20 a presentation according to FIG. 18 with modified upper and lower shells.

In accordance with the embodiment in FIG. 2, an additional locking feature is contemplated in order to see to it that the interior part (2) is placed in a removal position when the shells (1,3) are in the open position. For this purpose, the interior part (2) is, in accordance with the embodiment of FIG. 2, equipped with a locking projection (44), which, when it is in the open position, rests on an upper edge (46) of the side wall pieces (7) of the lower shell (1). In the position where the shells are rotated inwardly, the locking projection (44) can be received by the locking recess (45). The locking recess (45) is provided in the region of an interior side of the side wall piece (7). In principle, it is also conceivable to connect the locking protrusion (4.4) with the side wall piece (7) and to provide a locking recess (45) in the region of the interior part (2), which the locking projection (44), in the case of this embodiment, engages in the open position. In order to facilitate the positioning movements, the locking projection (44) and the locking recess (45) are provided with appropriate entrance and exit flanks, which are diagonally disposed.

A further concept of the invention consists in providing a modular configuration. This modular configuration is made in such a way that the same lower shells (1) and the upper shells (3) are used at all times, which can be equipped, depending on the requirements, with different interior parts (2). For example, either the interior part (2) in accordance with the embodiments of P 43 02 236.7 or the interior part according to FIG. 1 can be selected to be used. Beyond this, it is, however, also conceivable to provide interior parts which comply, in principle, with the embodiments according to P 33 01 644, GB 21 54 515, P 34 14 903 or EP 0 430 956, which, however, contain geometries adapted to the lower shell (1) and the upper shell (3). Additionally or alternatively, the lower shell (1) or the upper shell (3) can also be equipped with inserts, which, for example, am known from EP 0 114 631, and which also have the purpose of holding a compact disc in a clamping position. Instructions for the adaptation of the geometries am published in DE-OS 42 10 826.8. In these instructions, it is explained how the modular concept, according to the invention, for the different interior parts (2) can be implemented with the standard housing shells (1,3).

By means of the modular configuration it is, therefore, possible to provide either an interior part for holding a compact disc in a clamping position in the region of its edge, to construct a part for holding the compact disc in the area of its central hole (14) which can be folded like a book, or to achieve comparable holding of the compact disc in the region of its central hole in the area of the inserts for the lower shell and the upper shell.

If the compact discs are held in the region of their central hole, then a further concept according to the invention consists in providing the interior part (2) with tab-like protrusions, which, in their side view, have the configuration according to FIG. 3 and which are arranged according to the top view of FIG. 4. Originating at the interior edge (47) of the interior part (2), the tab-like ridges (48) protrude radially into a central opening (49) of the interior part (2). The tab-like ridges (48) are located essentially in a plane generated by the plate-shaped interior part (2). A cross-ridge (50) is adjacent to the tab-like ridge (48) and proceeds in the direction of a center of the central opening (49), which cross-ridge is held in place in the area of its average extension from the tab-like ridge (48). In the area of its extension facing toward the interior edge (47), the cross-ridge (50) has a contour which brings it slightly closer to the interior edge (47) in a direction away from the tab-like ridge (48). This makes it possible to carry out a clamping and holding action of compact discs, which are placed upon the annular contour generated by the cross-ridges (50). The cross-ridge (50), therefore, consists of two cross-ridge segments (51,52), which are connected with one another in the area of their extension facing toward the tab-like ridge (48). The cross-ridge segment (51) contains a radial ridge (53) in the area facing away from the tab-like ridge (48), which is extended in the direction toward the center of the central opening (49). The other cross-ridge segment (52) is constructed without such a radial ridge (53).

In particular, it is now being considered to provide, in an arrangement of the cross-ridges (50) along the interior edge (47), an alternating arrangement of the radial ridges (53) in such a manner that, as shown in a top view according to FIG. 4, in a direction along the interior edge (47) a cross-ridge segment (51) with the radial ridge (53) alternates with a cross-ridge segment (52) without the radial ridge (53). This facilitates ease of handling as well as the production of a mold for the injection molding process without undercuts.

Figure 5:
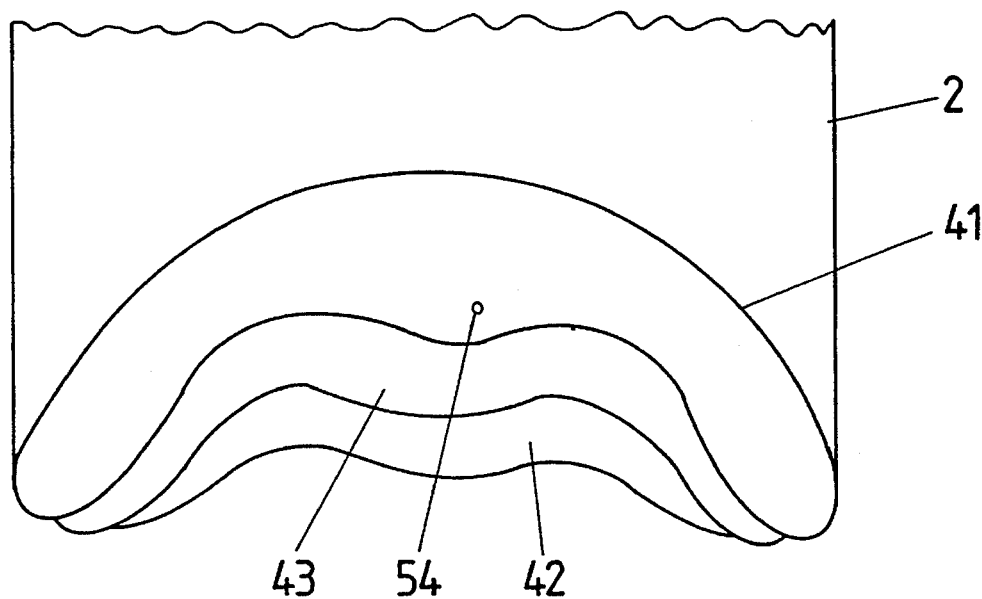

An alternate embodiment according to FIG. 1 is shown in a top view in FIG. 5. The ridges (41,42,43) are shown here with a sharply curved M-shaped contour in the direction of their extension which can be turned toward the compact disc. In particular, consideration is being given to providing a radius generated by the ridges (41,42,43) which is larger than an outer radius of the compact disc. This ensures that the compact disc, when it is being inserted, is initially grasped by central projection (54) and that the insertion into the lateral regions of the clamping slots ( 15, 16, 17) occurs subsequently. This reliably avoids tilting.

Figure 6:
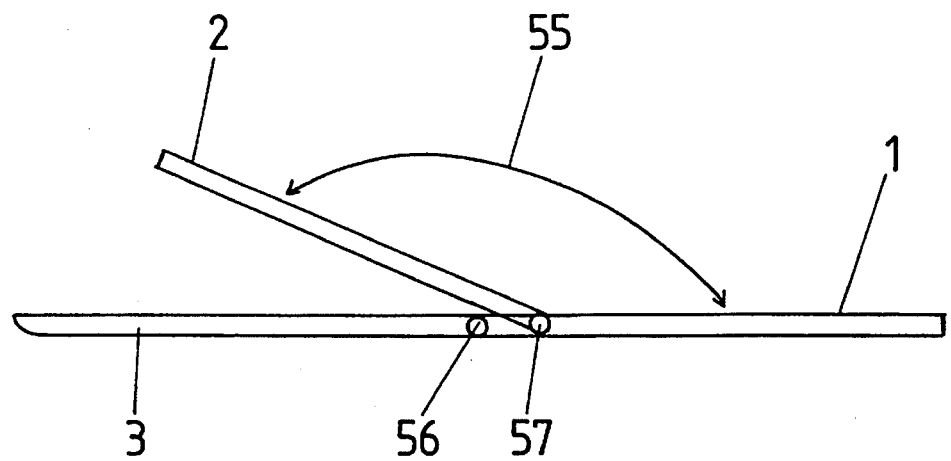

In accordance with the embodiment of FIG. 6, it is contemplated to limit an angle of rotation (55) for the interior part (2) in such a defined way, that when upper shell (3) is opened relative to the lower shell (1) by about 180°, the maximum angle of rotation of the interior part (3) relative to the lower shell (1) is limited to approximately 130° to 150°. This can be accomplished by appropriate locking features or projections in the edge region of the interior part (2) or the upper shell (3). At the same time care must be taken to ensure that upon reaching the maximum angle of rotation, a further rotary motion is terminated by parts which are adjacent to each other.

Figure 7:
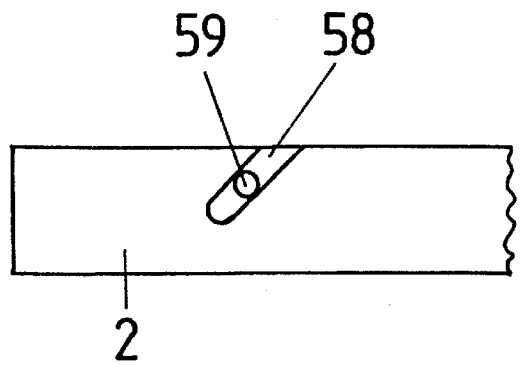

In accordance with the embodiment of FIG. 7, it is contemplated to undertake an automatic opening of the interior part (2) when the upper shell (3) is opened relative to the lower shell (1). This takes advantage of the fact that the axis of rotation of the upper shell (3) relative to the lower shell (1) as well as that of the interior part (2) relative to the lower shell (1) are offset from each other. This is made clear by the depiction of the exterior hinge (56) and the interior hinge (57) in accordance with FIG. 6. When a movement to open the upper shell (3) occurs, then the interior part (2) rotates about a different axis of rotation than the upper shell (3). If, for example, a guide slot (58) is provided in the region of a side surface of the interior part (2) into which the upper shell (3) intrudes with a guide peg (59), then, during an opening movement of the upper shell (3), the interior part (2) is initially also rotated by means of the guide peg (59), which engages a guide slot (58). Because of the different radii of motion, the guide peg (59) moves in the direction of an opening of the guide slot (58), from which the guide peg (59) exits after a limiting angle is reached. From this moment, a further rotation of the interior part (2) by the upper shell (3) can no longer be carried out. It is especially useful to see to it that the locking projection (44) and the locking recess (45) become active even before a separation of the guide peg (59) from the guide slot (58) takes place. This prevents the interior part (2) from falling back. As an alternative, it is also possible to place the guide slot (58) in the area of the upper shell (3) and the guide peg (59) in the region of the interior part (2).

Figure 8:
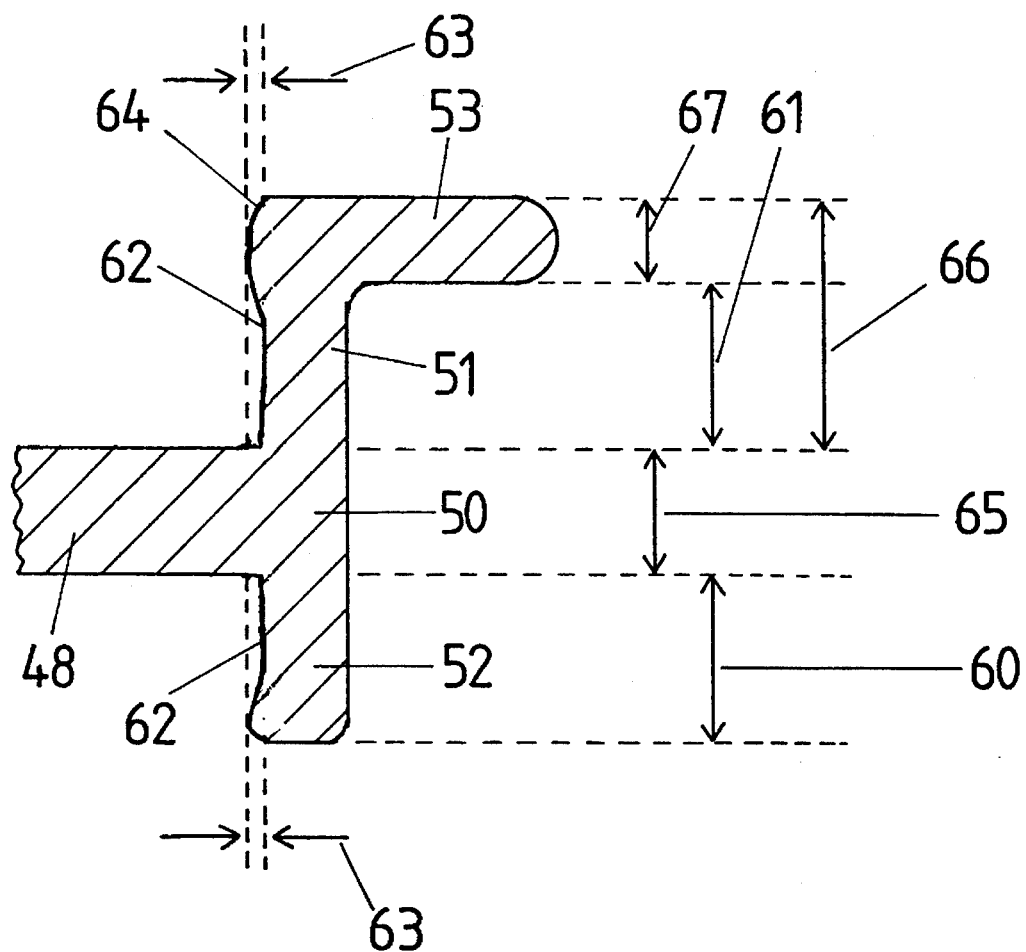

FIG. 8 shows an embodiment, which was modified from that shown in FIG. 3. According to FIG. 8, the cross-ridge segment (52) is smaller in the vertical direction toward the tab-like ridge (48) than the combination of the cross-ridge segment (51) and the radial ridge (53). For example, the dimensioning can be such that the cross-ridge segment (52) has a segment length (60), which corresponds approximately to a partial length (61) of the cross-ridge (51), in the region of which the cross-ridge (51)is extended between the tab-like ridge (48) and the radial ridge (53). By choosing these dimensions the ability of the interior parts (2) to be stacked, when a multitude of the interior parts (2) are placed one above the other while they are being transported, is improved. Therefore, a large number of the interior parts (2) can be stacked in a small volume. In the area of their boundary surfaces, which are facing the tab-like ridge (48), the cross-ridges (51,52) contain the clamping profiles (62), which are generated by increasing the material thickness in the direction of the tab-like ridge (48). In particular, it is contemplated to produce clamping profile (42) by giving it an appropriate shape during the injection molding process in such a manner that it can easily be deformed by an appropriate spring-elastic deformation. For radial clamping of the compact discs, the clamping profile (62) is provided with a profile depth (63).

Therefore, by means of an alternating arrangement of the cross-ridges (51,52) a radial clamping action and support of the compact discs occurs in the region of each cross-ridge (51,52); however, a funnel-like curved entrance surface (64) is only provided at the cross-ridges (51) in the area of the externally rounded transition member to the radial ridges (53). However, this is completely sufficient for performing the function.

The dimensioning of the elements according to FIG. 8 can, for example, be implemented in such a manner, that a ridge thickness (65) of the tab-like ridge (48) amounts to approximately 1 mm. The length of segment (60) can only amount to approximately 1.1 mm to 1.2 mm. The total length (66), which is composed of the partial length (61) and the radial ridge thickness (67), amounts to about 1.9 mm. For the thickness of the ridge (65), values in the range of from about 0.8 mm to 1.2 mm are also suitable.

Each of the embodiments shown in FIG. 1 to FIG. 8 can be constructed as alternative or supplementary versions to the embodiments in FIG. 9 to FIG. 12. Thus, each embodiment represents an autonomous and inventive design.

Figure 13:
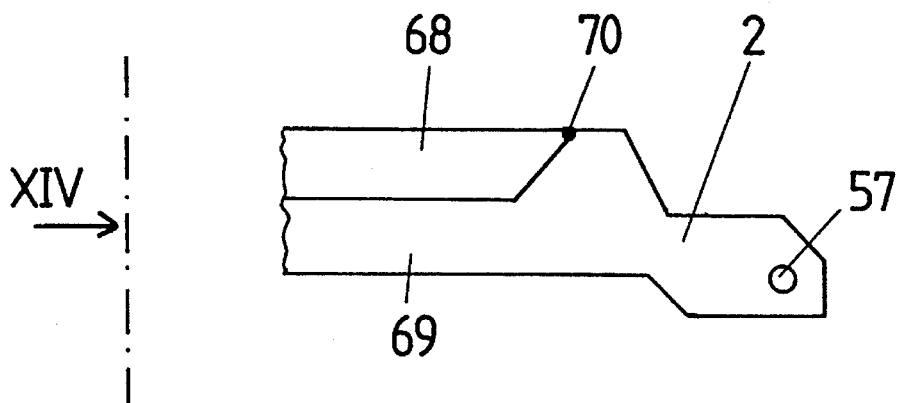

According to the embodiment in FIG. 13, it is contemplated that the interior part (2) according to FIG. 1 is divided into two component plates (68,69). The component plates (68,69) are joined to each other by way of an interior pivot link (70). In particular, it is contemplated to position the interior pivot link (70) in such a manner that it is offset from the interior hinge (57). However, in principle, it is also conceivable to place the interior pivot link (70) and the interior hinge (55) along a common center line. By dividing the interior part (2) into the component plates (68,69), which can be rotated relative to each other, the use of the clamping slots (15,16,17) in the region of the interior part (2) provide for easier access to that compact disc, which is located in the area of the clamping slot (16). It is also conceivable to subdivide the interior part (2) into three plates which can be rotated relative to each other.

Because of the division of the interior part (2) into the component plates (68,69) the material thickness in the area of the interior ridges (42,43) is reduced if an equal structural thickness of the interior part (2) is to be achieved, because each of the clamping slots (15,16,17) can only be provided with half of the material thickness. In order to avoid that this results in a reduction of structural strength it is contemplated according to the embodiment of FIG. 14 to provide the component plates (68,69) with teeth, which mesh with each other. Thus, no smooth boundary surface is formed between the component plates (68,69), but the two surfaces are provided with interlocking teeth. According to the embodiment in FIG. 14, a rectangular contour for the teeth is chosen, however, triangularly shaped teeth, for example, or curved teeth contours could also be provided.

Figure 14:
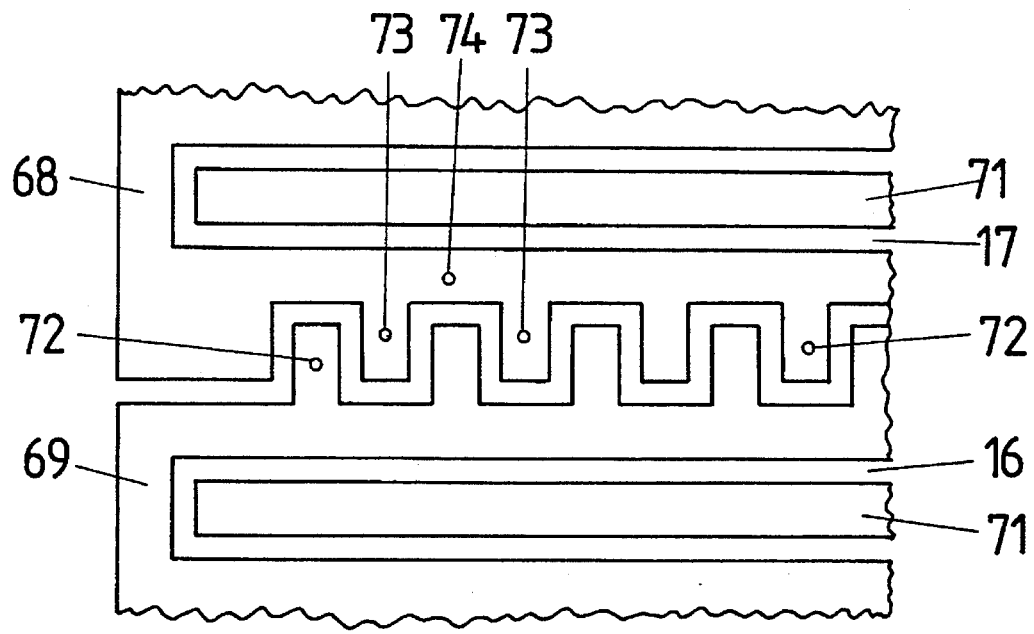

According to FIG. 14, two compact discs (71) are inserted into the clamping slots (16,17). The interacting teeth (72) can be the same kind of teeth; however, in principle, variations in the interacting row of teeth (72) are also possible. Between the individual teeth (73) there is always a connecting ridge (74), which provides the required cohesion.

Figure 15:
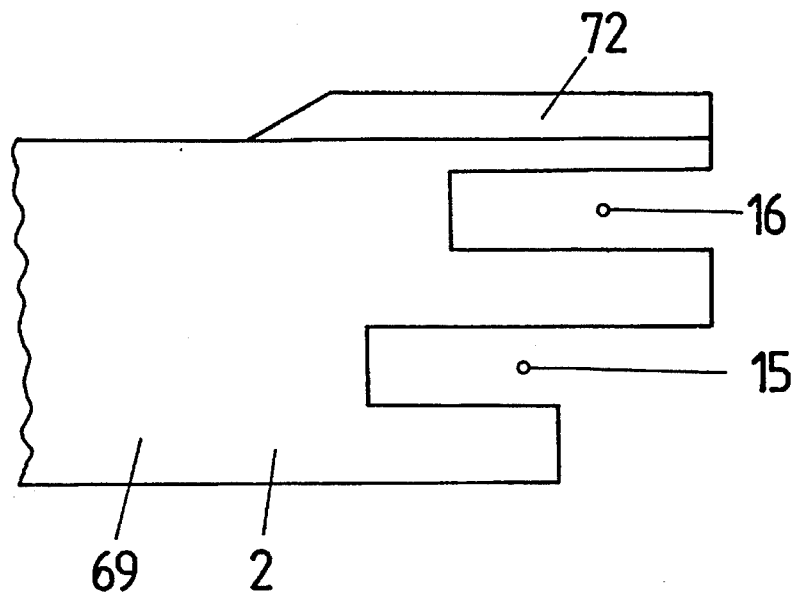

From FIG. 15 it can be seen that it is, in principle, sufficient to place the interacting teeth (72) in the vicinity of the clamping slots (15,16,17). In the extended region of the interior part (2) the interacting teeth (72) can be dispensed with, because in this location there is a greater material thickness, which is not weakened by the clamping slots (15,16,17).

Figure 16:
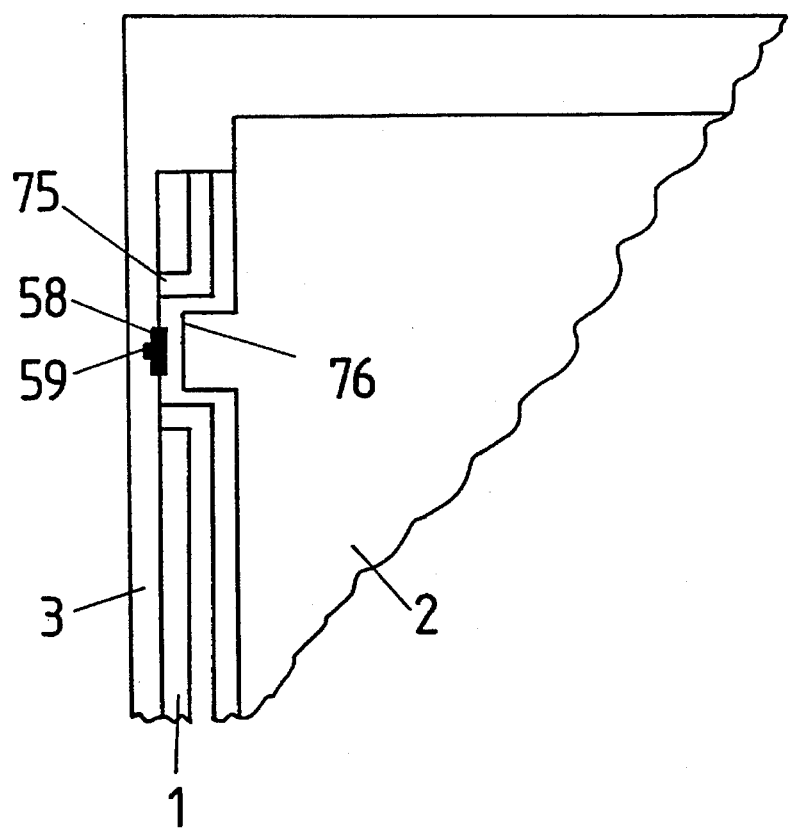

FIG. 16 shows in a top view a further presentation for clarifying the pick-up means according to FIG. 7. It can be seen that in the area of the side wall of the lower shell (1) a recess (75) is provided into which the interior part (1) penetrates by means of side wall profile (76). With the aid of the side wall profile (76) the interior part (2) engages the area of the upper shell (3), so that interaction between the guide slot (58) and the guide peg (59) is made possible.

In devising a pick-up means or a locking feature for setting up a defined angular position of the interior part (2) relative to the lower shell (1) and the upper shell (3), it is useful for an interior part (2) in order to hold two or several compact discs, to provide at two angular positions of the interior part (2) appropriate locking features. For example, it is possible when opening up the upper shell (3) relative to the lower shell (1) by an angle of 180°, to provide a locking angular position for the interior part (2) relative to the lower shell (1) of 20°, as well as a further locking position of the interior part (2) relative to the upper shell (3) of 20°. This further eases removal of the compact discs.

The interior pivot link (17) can be made in different embodiments. For example, it can be made with journals which fit into corresponding recesses. But it is also conceivable to devise a hinge effect by an appropriate reduction of the material thickness.

The CD-case in accordance with FIG. 17 to FIG. 20 likewise includes a lower shell (1), an interior part (2) and an upper shell (3). The lower shell (1) includes a bottom plate (4) at the edges of which the rear wall part (5), the front wall part (6), the side wall parts (7), the ridges (8,9), as well as the hinge wall parts (10) rise vertically from the plane of the bottom plate. The hinge wall pieces (10) are connected to the ridges (9) in one piece and are connected by way of their corners with the rear wall part (5). The ridges (8,9) are somewhat laterally displaced toward the inside with regard to the side wall pieces (7). The hinge wall pieces (10) each contain a bore (11) and a bore (12) which have the purpose of receiving the hinge pins of the upper shell or of the interior part (2).

The interior part (2) contains a holding plate (13), in the center of which there is an opening (114) into which protrude from its edge radially toward its center the holding tabs (115) (see FIG. 19), which, in addition, protrude axially at both ends and on both sides from the plane of the bearing plate (see FIG. 18) and thus constitute a device for clamping a CD at its center hole on both sides of the bearing plate. There are four recesses (116) in the bearing plate which also protrude into the corner regions of the holding plate (13) which are not covered by an inserted CD. Even when a CD is inserted it is, therefore, possible to engage these recesses in order to grasp the CD at its outer edge and lift it off the interior part (2). The edge ridges (117,118,119) are disposed at three side edges of the holding plate (13); at two opposite side edges the side wall pieces (120) extend outwardly. These side wall pieces (120) are trapezoidal and contain chamfered edges (121) which, when the case is closed, align themselves with the chamfered edges (122) of the side wall pieces (7) of the lower shell (1). At the back side of the holding plate (13) there is disposed a diagonal wall (123) which forms an obtuse angle with the holding plate (13) and which carries a rear edge plate (124) running parallel to the holding plate (13) and extending outwardly. The rear edge plate (124) carries at its ends, which are facing the hinge wall pieces (10) of the lower shell (1), the two hinge wall parts with one hinge pin (126) each, which interact with the bores (12) of the hinge wall piece (10). The hinge wall pieces (125) are, at the same time, enclosed by the hinge wall pieces (10) of the lower shell (1).

The distance of the hinge pins (126) from the rear edge (127) of the rear edge plate (124) is smaller than the distance of the bore (12) from the rear wall piece (5) and the bottom plate (4), so that an unobstructed pivoting of the interior part (2) around the axis generated by the hinge pins (126) and the bores (12) is possible. In the case of a complete rotation of the interior part (2), the ridges (119) impinge on the upper edge of the rear wall part (5). As a result of the offset position of the rear edge plate (124) with the hinge wall parts (125), which contain the hinge pins (126), relative to the plane of holding plate (13), the edge ridges (119) do not impinge on the rear wall part (5) until a rotation of 180° or more has been completed. The interior part (2) can, therefore, be completely opened like the page of a book.

The Upper shell (3) includes a cover plate (23) at which the two narrow-sided walls (24) rise vertically from the plane of the cover plate at two opposite edges. These narrow-sided walls (24) are joined in one piece with the hinge wall parts (25), which include the inwardly protruding hinge pins (26). The edge of the cover plate (23) facing the hinge wall parts (25) includes a strip (27) pointing in the same direction as the narrow-sided walls (24), and further includes along with the hinge wall parts (25) a recess (28). There are inwardly extending holding stems (29) at the narrow-sided walls (24). These have the function of holding an insert card, not shown here, which is inserted into the upper shell (3). The strip (27) functions as the stop for this insert card. The narrow-sided walls (24) each contain a trapezoidal recess (30).

The hinge wall parts (25) of upper shell (3) engage the hinge wall pieces (10) of the lower shell (1) from outside. At the same time, the hinge pins (26) protrude into the bores (11). When the case is in its closed position, the recess between the rear wall part (5) and the edge of the cover plate (23), which contains the strip (27), is filled by the rear edge plate (124) of the interior part (2). The side wall pieces (7) of the lower shell (1) and the side wall pieces (120) of the interior part (2) mesh tightly with the recesses (30) of the narrow-sided walls (24). The strip (37) is supported by the protrusions (36) of the interior part (2) (see FIG. 19) thus increases the stability of the closed case.

Figure 17:
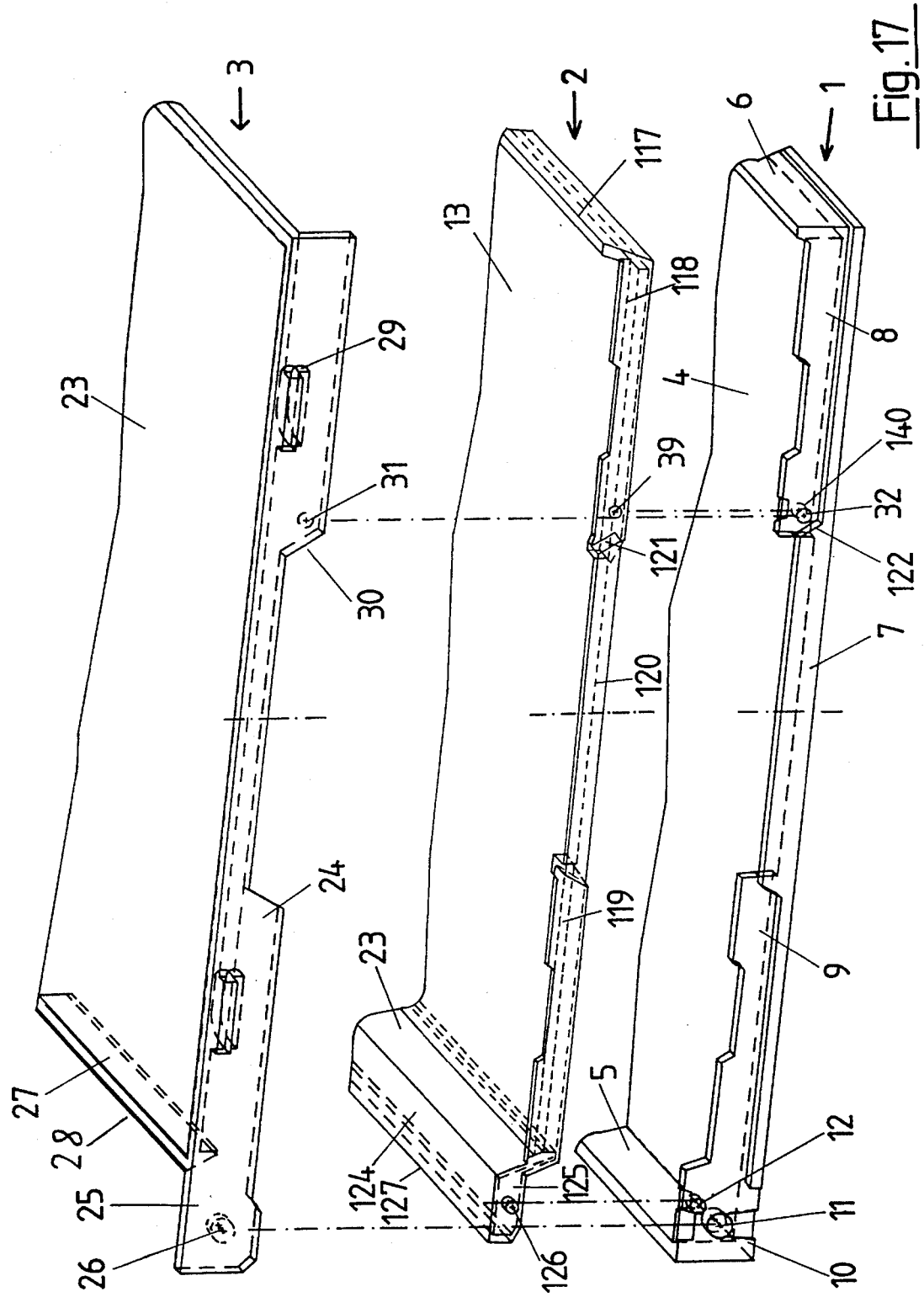
Figure 18:
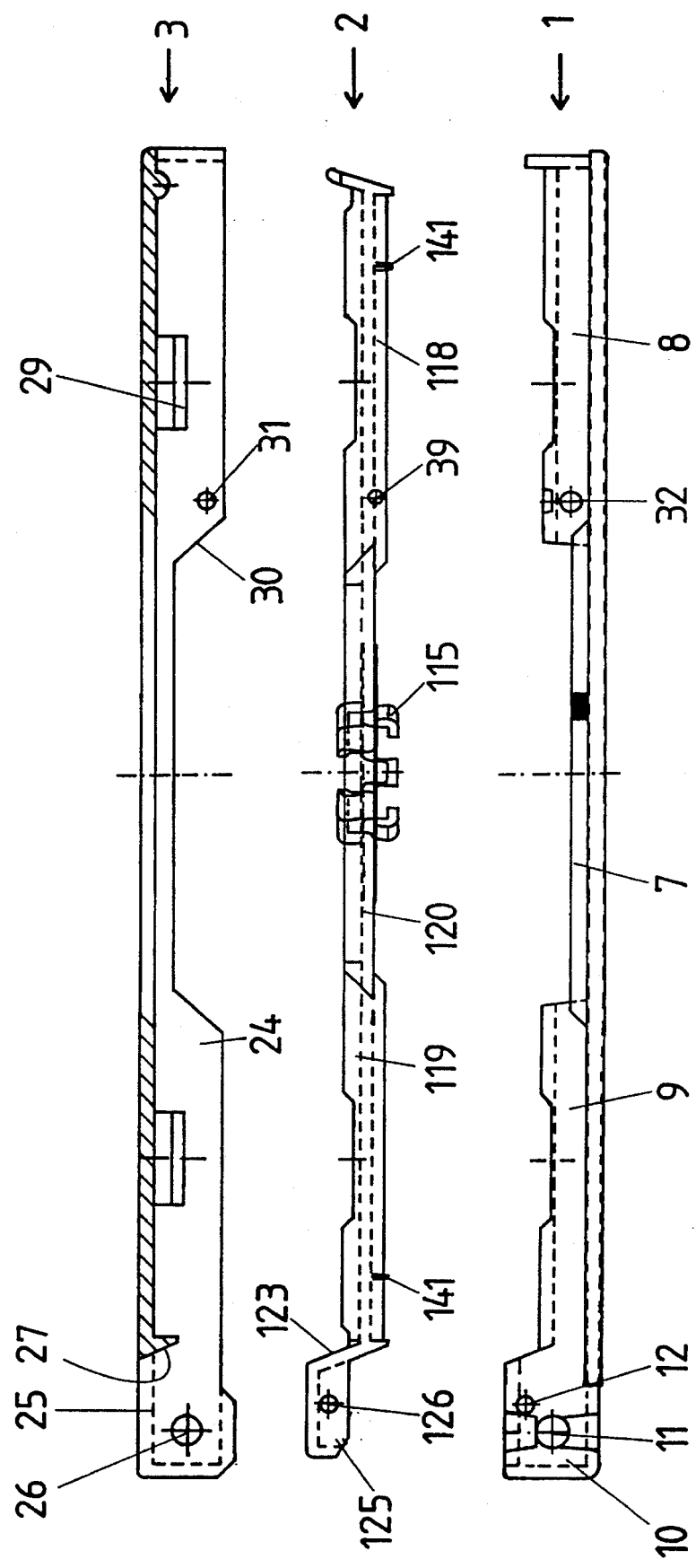
Figure 19:
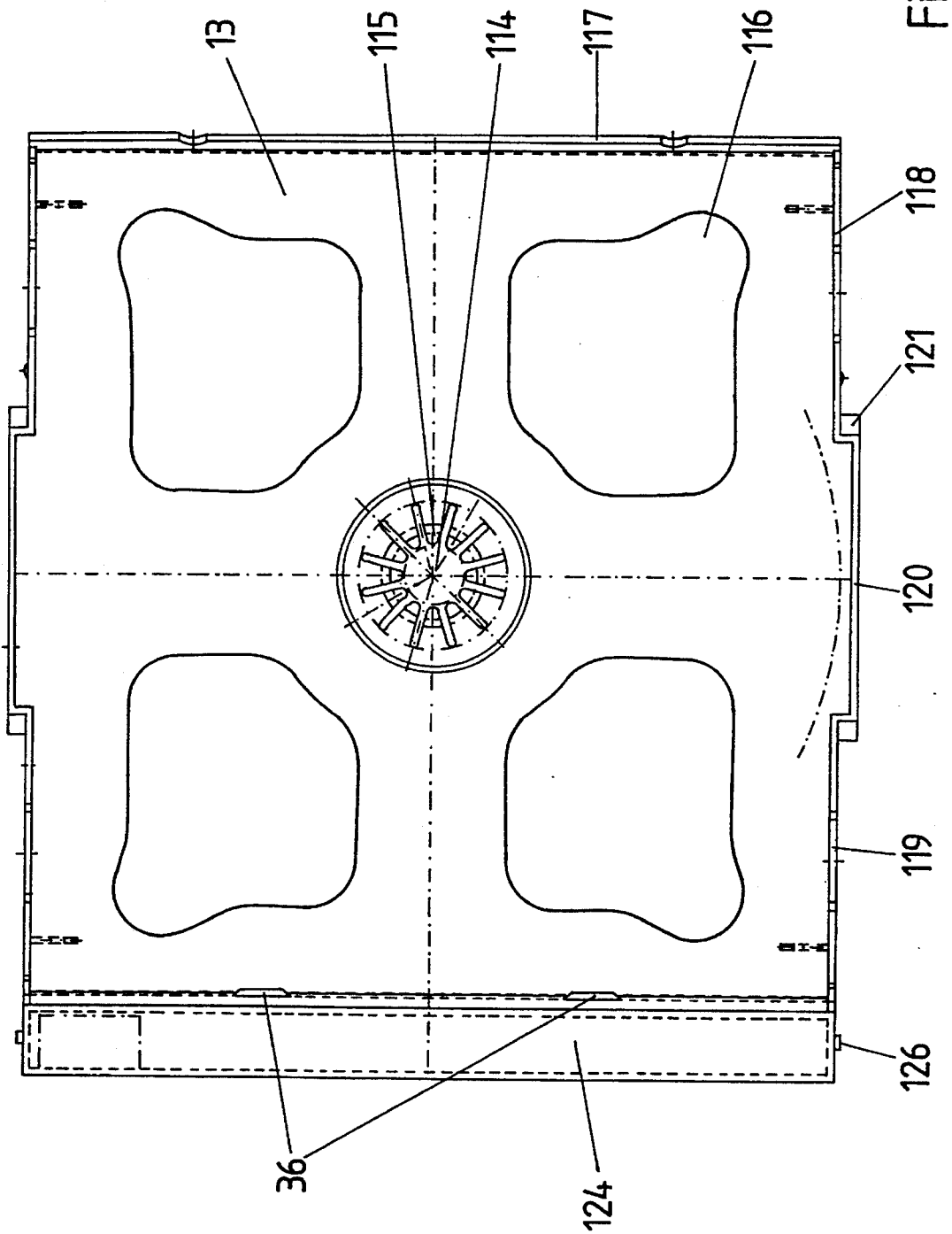

One can see in FIG. 17 that as a result of the hinge systems, which are independent from each other, for connecting the lower shell (1) with the interior part (2), on the one hand, and of the lower shell (1) with the upper shell (3), on the other hand, the interior part (2) can initially be independently stocked with CD's and can subsequently be inserted into the case.

When the closed case is opened, either only the upper shell (3) can be opened by the grasping narrow-sided walls (24), or the interior part (2) can be opened simultaneously by grasping its side wall pieces (120). During the simultaneous opening of the upper shell (3) and the interior part (2), the two parts are displaced relative to each other because of their offset hinge axes.

Because of the bevelled edges (121) of the side wall pieces (120), the side wall pieces (120) do not jam the recesses (30) but slide out of them, and, therefore do not obstruct the pivot movement. The narrow-sided walls (24) Of the upper shell (3) each contain a locking stem (31) at their interior side, which interact with the recesses (32) in the ridges (8) of the lower shell (1) to establish a locking mechanism. The edge ridges (118) of the interior part (2) contain locking stems (39), which interact with the recesses (140) provided at the interior sides of ridges (8) of the lower shell (1) in order to create a locking mechanism. An inadvertent opening of the case is thus prevented. The locking stems (39) and the recesses (140) function, at the same time, to improve the support of the interior part (2) during the automatic insertion of the lower shell (1).

At the bottom of the holding plate (13) of the interior part (2) there are four support feet (141) (see FIG. 18), which are supported during the stacking of several interior parts (2) on the holding plate (13) of the particular interior part (2) which happens to lie below it. They are located near the edge ridges (118,119) and impinge upon these edge ridges (118,119) even during a small lateral displacement of the stacked interior parts (2). Thus they provided lateral guidance as well for the stacked interior parts (2).

Figure 20:
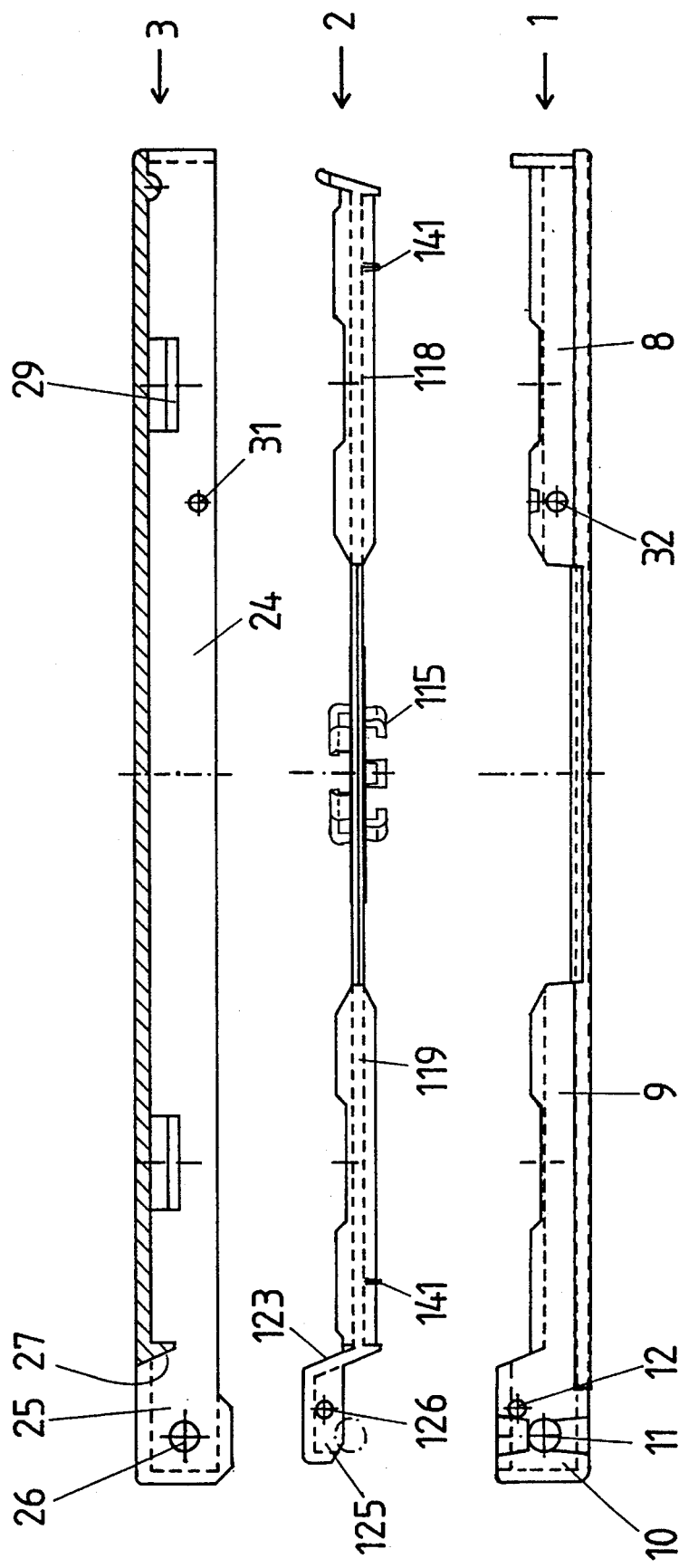

FIG. 20 shows another embodiment of the case according to the invention. Here, the lower shell (1) as well as the interior part (2) do not include any side wall pieces. The narrow-sided walls (24) of the upper shell (3) are, in this case, continuous without any recess. Therefore, when this case is opened, at first only the upper shell (3) can be opened, but not, at the same time, the interior part (2). It must be grasped separately after pivoting the upper shell (3) into the open position and then opened. In this embodiment, only the upper shell (3) and the lower shell (1) contain the locking stems (31) and the recesses (32) which engage each other. The interior part (2) and the lower shell (1) have no interacting locking features in order to avoid making it more difficult to open the interior Part (2), because it can now no longer be grasped at the side wall pieces.

Both types of interior parts (2) can be stocked With CD's on the conventional machines and inserted into the lower parts (1).

I claim:

1. A case for storing compact discs comprising a lower shell, an upper shell and an interior part, said interior part is held between the upper shell and the lower shell in a hinge arrangement, and where the interior part includes means for holding at least one compact disc in a locking position, characterized in that the interior part (2) includes a plurality of clamping slots defined by interior ridges disposed between said slots and outer ridges on the outer sides of said slots, at least one of said interior ridges being provided with a profile border edge (14) such that interior ridges (42,43), which separate the clamping slots (15,16, 17) from each other, protrude farther in a direction away from the interior part (2) than the outer ridges (40,41).

2. A case according to claim 1, characterized in that the outer ridges (40,41) are approximately of the same size.

3. A case according to claim 2, characterized in that each of said clamping slots (15,16,17) extends into said interior part to approximately the same depth as measured from the outer end of one of said interior and exterior ridges.

4. A case according to claim 3, characterized in that the interior ridges (42, 43) have different lengths in a direction away from the interior part (2).

5. A case according to claim 1, characterized in that said plurality of slots include at least one interior slot and exterior slots on opposite sides of said interior slots, and a bottom region of the intermediate clamping slot (16) protrudes by a smaller amount into the interior part (2) than the outer clamping slots (15,17).

6. A case according to claim 1, characterized in that said interior part is movable between an open position to afford access to said discs and a closed position and in order to position the interior part (2) relative to the lower shell (1) in an open position, a locking peg (44) is provided on one of said interior part and said lower shell, said locking peg being operative to maintain said interior part in said open position, the other of said interior part and said lower shell being provided with a locking recess.

7. A case according to claim 6, characterized in that the locking peg (44) is disposed on said interior part (2), and in its closed position said locking peg is receivable in said locking recess (45), which is provided on a side wall piece (7) of the lower shell (1).

8. A case according to claim 6, characterized in that the locking peg (44) is formed as part of a side wall piece (7) of said lower shell and engages the locking recess (45), which is provided on the interior part (2), while the interior part (2) is in a closed position.

9. A case according to claim 1, characterized in that the slots (15,16,17) are each defined by sidewalls and a bottom, said sidewalls are tapered toward the bottom of each of the slots.

10. A case according to claim 1, characterized in that each of the slots (15,16,17) forms a circular arc in said plane of the compact disc which is to be inserted into the slot (15,16,17), and which circular arc has a radius approximately corresponding to the radius of the compact disc.

11. A case according to claim 10, characterized in that the interior part (2) includes a plurality of clamping slots (15,16,17), disposed one above the other, which are constructed to receive a plurality of compact discs in positions offset from each other.

12. A case according to claim 1, characterized in that the interior part (2) consists of two plate elements (68,69), said two plate elements being joined to each other by an interior pivot link (70) and each of which is equipped with at least one of said clamping slot (15,16,17).

13. A case according to claim 12, characterized in that one of said plates is pivotably connected to said lower shell by an interior hinge and the interior pivot link (70) is offset relative to the interior hinge (57).

14. A case according to claim 12, characterized in that said plate elements (68,69) are provided with facing surfaces, said facing surfaces being provided with teeth (72), which engage each other.

15. A case according to claim 1, characterized in that the interior part (2) is connected to the upper shell (3) during a closing and opening movement by means of a guide peg (59) engaging a guide slot (58) provided on said lower shell, and that the interior part (2) includes a sidewall (76) which sidewall engages a recess (75) provided on said lower shell (1) in the direction of the upper shell (3).

16. A case for storing compact discs, with a lower shell, an upper shell and an interior part, which is held between the upper shell and the lower shell in a hinge arrangement and where the interior part includes means for holding at least one compact disc in a locking position, characterized in that the interior part (2) is one element of a modular system which contains as its elements a simple tray for clamping compact discs (71) in place in the area of their central opening, a double tray for clamping a compact disc (71) in place by engaging the periphery of the central opening provided in each of said compact discs, a lateral clamping element with a clamping slot (15) for clamping each compact disc (71) in place along a portion of said compact disc's edge, a lateral clamping element with two clamping slots (15,16) as well as a lateral clamping element with three clamping slots (15,16,17), and that each element can be optionally inserted into the lower shell (1) and the upper shell (3), said lower shell and said upper shell each having the same shape for receiving each element.

* * * * *